US010160349B2

(12) United States Patent
Larouche et al.

(10) Patent No.: US 10,160,349 B2
(45) Date of Patent: Dec. 25, 2018

(54) VEHICLE FOR A PEDESTRIAN ENVIRONMENT

(71) Applicant: Wattman Trains & Trams Inc., Granby (CA)

(72) Inventors: Renaud Larouche, Sherbrooke (CA); David Galley, Acton Vale (CA); Rod Fortin, Granby (CA); Alain Bernier, St-Hyacinthe (CA)

(*) Notice: Subject to any disclaimer, the term of this patent is extended or adjusted under 35 U.S.C. 154(b) by 32 days.

(21) Appl. No.: 15/506,139

(22) PCT Filed: Sep. 3, 2015

(86) PCT No.: PCT/CA2015/050845
§ 371 (c)(1),
(2) Date: Feb. 23, 2017

(87) PCT Pub. No.: WO2016/033689
PCT Pub. Date: Mar. 10, 2016

(65) Prior Publication Data
US 2017/0305302 A1   Oct. 26, 2017

Related U.S. Application Data

(60) Provisional application No. 62/046,153, filed on Sep. 4, 2014.

(51) Int. Cl.
*B62D 47/00* (2006.01)
*B60N 2/005* (2006.01)
(Continued)

(52) U.S. Cl.
CPC ............... *B60N 2/005* (2013.01); *B60R 9/06* (2013.01); *B62D 47/00* (2013.01); *B62D 51/02* (2013.01)

(58) Field of Classification Search
CPC .......... B60R 9/06; B60N 2/005; B62D 47/00; B62D 51/02
(Continued)

(56) References Cited

U.S. PATENT DOCUMENTS 8,547,530 B2   10/2013   Tan et al.
8,751,084 B2    6/2014   Marwell

FOREIGN PATENT DOCUMENTS

CA     2576837      1/2006
CN    201012636     1/2008
DE   102008007472   8/2009

OTHER PUBLICATIONS

Jithesh R., "Design of an Electric Cart" [online], published 2014, Industrial Design Centre at ITT Bombay. Available from (http://www.idc.iitb.ac.in/projects/student/projects/Electronic%20Cart.html).

(Continued)

*Primary Examiner* — Pinel E Romain
(74) *Attorney, Agent, or Firm* — Benoit & Cote, Inc.; C. Marc Benoit

(57) ABSTRACT

The present document describes a vehicle for transporting an individual in a pedestrian environment, the vehicle comprising: a main frame comprising a rear end and a front end, the main frame defining a longitudinal axis corresponding to a direction of straight forward movement of the vehicle; a motor mounted on the main frame and a drive unit operatively connected to the motor for propelling the main frame; a seat assembly mounted on the main frame, the seat assembly comprising at least two seats having an alignment direction corresponding to a direction the individual faces when seated in one of the at least two seats, the alignment direction making an angle between 45 degrees and 90 degrees relative to the longitudinal axis defined by the main (Continued)

frame; and a driving area at a rear end of the main frame for driving and operating the main frame.

18 Claims, 25 Drawing Sheets

(51) Int. Cl.
*B62D 51/02* (2006.01)
*B60R 9/06* (2006.01)

(58) Field of Classification Search
USPC .......................................................... 296/63
See application file for complete search history.

(56) References Cited

OTHER PUBLICATIONS

Dingeman, Robbie, "Honolulu airport getting $2.3B makeover" [online], Published 2007, Honoluluadviser. Available from (httpp://the.honoluluadvertiser.com/article/2007/Apr/08/bz/FP704080355.html).

Shenzhen Marshell Green Power Co., Ltd., "Electric 8 seat airport golf cart for sale DN-8D with CE from china company" [online]. Available from (http://marshell.en.alibaba/product/1183914788-221962199/electric_8_airport_golf_for_sale_DN_8D_with_CE_from_china_company.html).

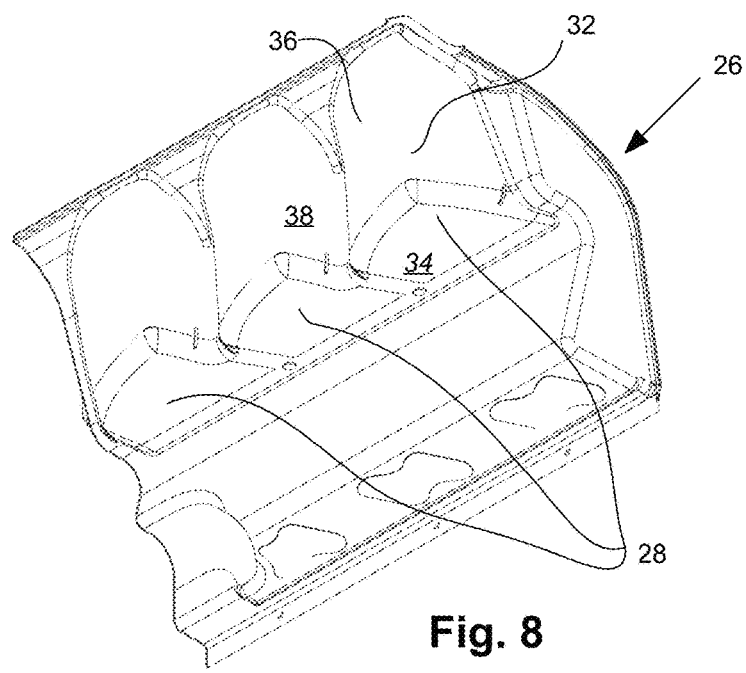
Fig. 8
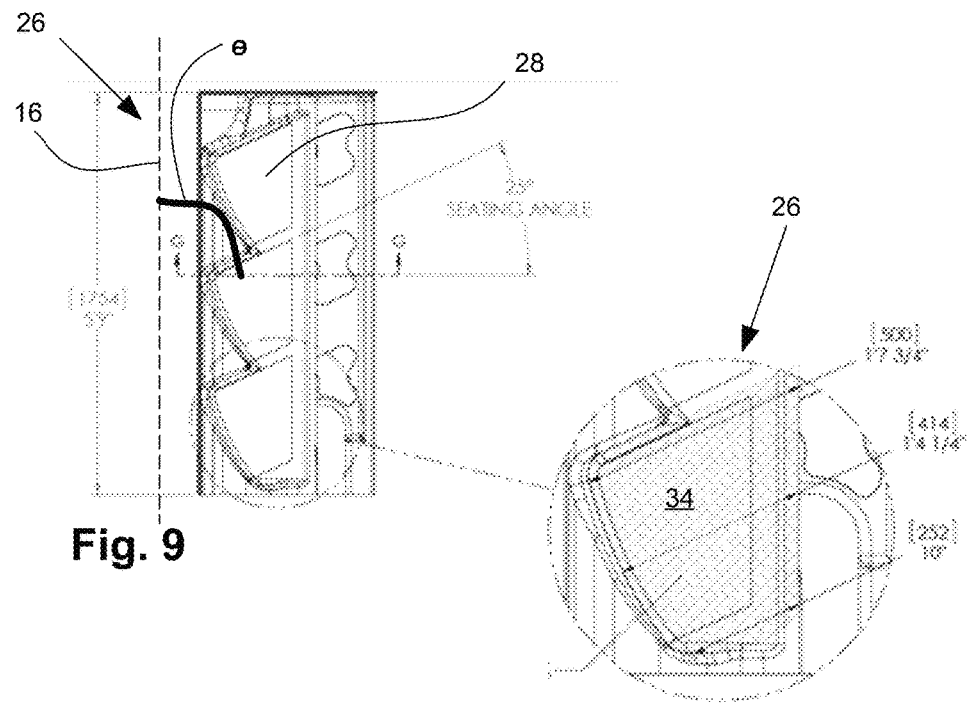
Fig. 9
Fig. 10

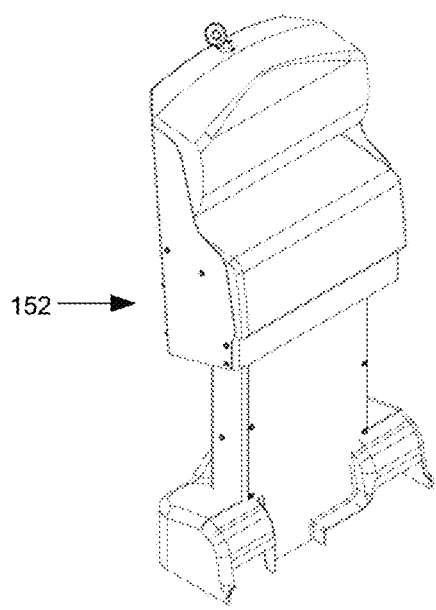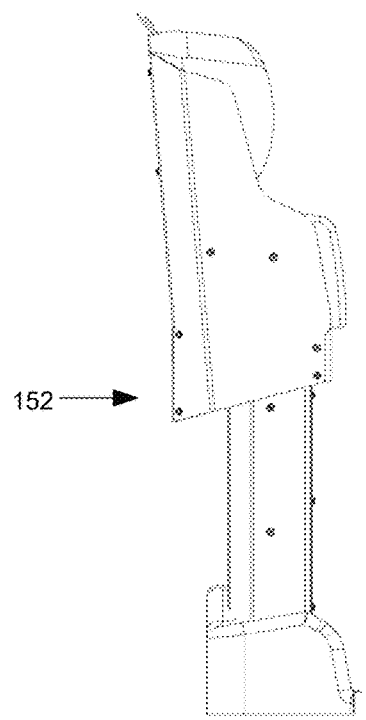
Fig. 24
Fig. 25

VEHICLE FOR A PEDESTRIAN ENVIRONMENT

CROSS-REFERENCE TO RELATED APPLICATIONS

This application claims priority of U.S. provisional patent application No. 62/046,153, filed on Sep. 4, 2014, the specification of which is hereby incorporated by reference.

BACKGROUND (a) Field

The subject matter disclosed generally relates to vehicles for pedestrian environments. More particularly, the subject matter disclosed relates to vehicles for transporting individuals in pedestrian environments such as airports, shopping centers, amusement parks, hotels, tourist areas, hospitals and the like.

(b) Related Prior Art

In many pedestrian environments, such as, without limitation, airports, shopping centers, amusement parks, hotels, tourist areas, hospitals, and the like, typical golf karts are often used to transport individuals (i.e., children, elderly people, travelers during their flight connections, etc.). Even if golf karts are very useful on golf playgrounds, they are often not the better option for other pedestrian environments.

As for example, in airports, when travelers are late for a flight, airplane companies often transport them from one gate to another. Conventional golf karts are often used for this purpose even if it does not provide a safe environment for the airplane company's customers and enough space for travelers with their luggage. Furthermore, as the driver is located in front of the passengers transported by his conventional golf kart, he has no clue about what is going on in the golf kart (i.e., behind him) and behind the golf kart itself. Using golf karts to transport passengers in an airport can therefore be found to be an unsafe practice.

On the other hand, a conventional golf kart may sometimes be hard to drive in pedestrian environments, as it needs to be driven as a conventional car. Objects or children can be located in front or in the back of the golf kart, and injuries can occur while the driver travels within a pedestrian environment.

Furthermore, conventional golf karts often give access to a limited number of individuals only, while there is often a need to transport a plurality of individuals in the pedestrian environment.

Moreover, it is often not convenient for travellers to get in and out a conventional gold kart with their luggage due to actual configurations of golf karts.

There is therefore a need for vehicles for transporting individuals in pedestrian environments that are safe, easily accessible by individuals and easily manoeuvrable by drivers.

SUMMARY

According to an embodiment, there is provided a vehicle for transporting an individual. The vehicle comprises a main frame having a substantially longitudinal shape and comprising a rear end and a front end opposite the rear end, the main frame defining a longitudinal axis; a seat assembly mounted on the main frame, the seat assembly comprising at least two seats each adapted for seating the individual and each comprising a backrest defining an alignment direction corresponding to a direction substantially perpendicular to a middle of the backrest, the alignment direction making an angle between 45 degrees and 90 degrees relative to the longitudinal axis defined by the main frame; and a driving area at the rear end of the main frame for driving and operating the main frame, wherein the driving area defines a driving position facing the front end of the vehicle.

According to an aspect, the seat assembly comprises a seat body in which the at least two seats are embedded, wherein each one of the at least two seats are adapted for seating a single individual.

According to an aspect, each one of the at least two seats further comprises a seat surface, from which extends the backrest, and a seat side wall extending from both the seat surface and the backrest.

According to an aspect, the seat surface, the backrest and the seat side wall are integral to the seat body.

According to an aspect, the seat assembly further comprises a plurality of handle elements, each one of the plurality of handle elements separating two adjacent seats of the at least two seats.

According to an aspect, a right side and a left side of the vehicle are defined respectively as a side to the right and to the left of the vehicle looking toward the front end of the main frame from the rear end of the main frame, further wherein the at least two seats comprise at least two seats on the right side and at least two seats on the left side.

According to an aspect, the vehicle comprises a front wall in the vicinity of the front end of the main frame, a rear wall in the vicinity of the rear end of the main frame and a floor member extending continuously between the front wall and the rear wall.

According to an aspect, the vehicle further comprises a motor mounted on the main frame and a drive unit operatively connected to the motor for propelling the main frame, wherein the motor and the drive unit are located under the seat assembly.

According to an aspect, the main frame further comprises a sliding rail assembly and wherein the seat assembly comprises a corresponding sliding rail assembly, the sliding rail assembly for slidably receiving the corresponding sliding rail assembly, thereby allowing the seat assembly to be slidable relative to the main frame between a closed and locked position and an opened position, wherein the opened position provides an access to the motor and drive unit.

According to an aspect, the closed and locked position of the seat assembly corresponds to the seat assembly being connected to the rear wall, the vehicle further comprising a releasable safety attachment between the rear wall and the seat assembly, wherein once disconnected the seat assembly is disconnected from the rear wall, the releasable safety attachment prevents the seat assembly from sliding past an intermediate position near the closed and locked position.

According to an aspect, the driving area further comprises a monitoring system operatively connected with the drive unit for allowing a driver to view around the main frame, the monitoring system comprising a closed-circuit television monitor in the driving area and a camera mounted on the main frame.

According to an aspect, the driving area further comprises an adjustable driver seat for allowing a driver to be in a selected one of: a completely seated position, a semi-seated position and a standing position.

According to an aspect, the adjustable driver seat comprises a driver seat portion and a driver backrest upwardly extending from the driver seat portion.

According to an aspect, at least one of: the driver seat portion and the driver backrest is at least one of: vertically and horizontally adjustable.

According to an aspect, the vehicle further comprises an attachment member behind the driving area for releasably receiving a luggage carrier to transport additional objects.

According to an aspect, the vehicle further comprises the luggage carrier releasably attached to the attachment member to transport the additional objects.

According to an aspect, the alignment direction makes an angle of 65 degrees relative to the longitudinal axis defined by the main frame.

According to an aspect, the vehicle further comprises a set of wheels for supporting the main frame, wherein at least one wheel from the set of wheels is rotatable 140 degrees for allowing rotation of the vehicle.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 8 is a close-up perspective view of a seat assembly in accordance with another embodiment;

FIG. 9 is a top plan view of the seat assembly of FIG. 8;

FIG. 10 is a close-up top plan view of one seat of the seat assembly of FIG. 9;

FIG. 24 is a front perspective view of the adjustable driver seat of the vehicle for a pedestrian environment shown in FIGS. 1-7;

FIG. 25 is a side elevation view of the adjustable driver seat of the vehicle for a pedestrian environment shown in FIGS. 1-7

It will be noted that throughout the appended drawings, like features are identified by like reference numerals.

DETAILED DESCRIPTION

Figure 1:
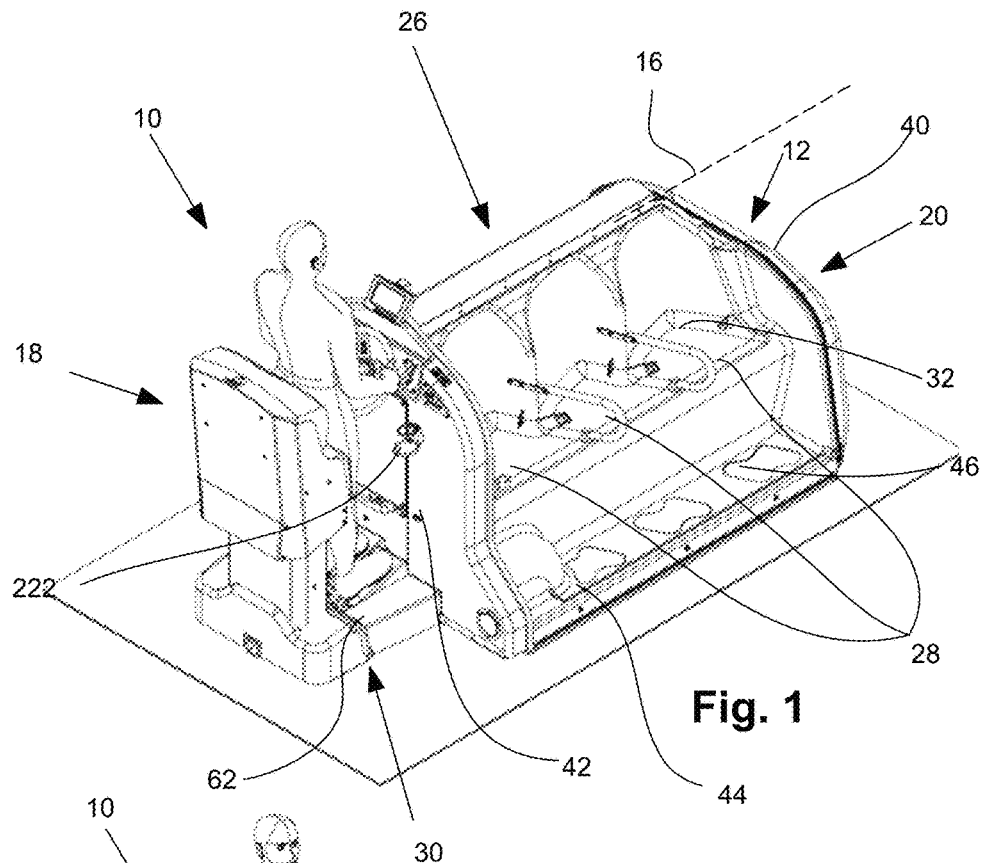
FIG. 1 is a rear perspective view of a vehicle for a pedestrian environment in accordance with an embodiment.
Figure 2:
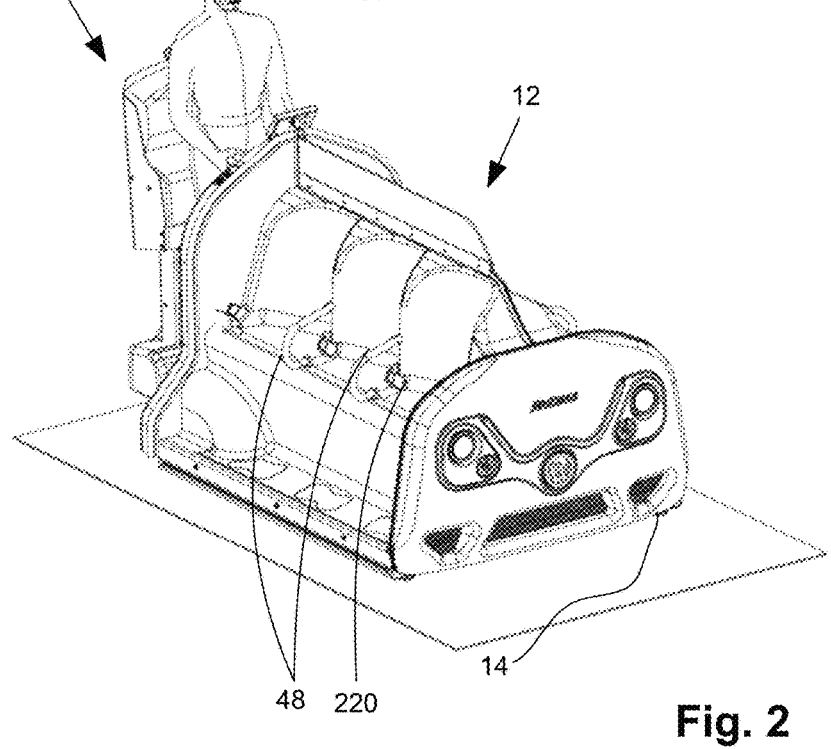
FIG. 2 is a front perspective view of the vehicle for a pedestrian environment of FIG. 1.

In embodiments, there are disclosed vehicles for transporting individuals in pedestrian environments such as, without limitation, airports, shopping centers, amusement parks, hotels, tourist areas, hospitals, and the like.

Referring now to the drawings, and more particularly to FIGS. 1-5, there is shown a vehicle 10 for transporting one or more individual(s) (not shown) in pedestrian environments in accordance with an embodiment. The vehicle 10 includes a main frame 12 which is supported by a set of wheels 14. The main frame 12 defines a longitudinal axis 16 between a rear end 18 of the main frame 12 and a front end 20 of the main frame 12. The vehicle 10 further includes a motor (not shown) which is mounted on the main frame 12 and a drive unit (not shown) operatively connected to the motor for propelling the main frame 12. The vehicle 10 further includes a seat assembly 26 which is also mounted on the main frame 12. As shown in FIGS. 1-5, the seat assembly 26 includes six seats 28 which are configured substantially perpendicular to the longitudinal axis 16 defined by the main frame 12. However, it is to be noted that the seat assembly 26 may include one or more seats 28 such as to receive one or more individuals (i.e., one seat, two seats, six seats, ten seats, twenty seats, etc.) and that each seat 28 may be organized in a different manner according to the longitudinal axis 16 defined by the main frame 12 (i.e., for example, it is possible to find one seat looking forward and a plurality of seats looking on right and left sides of the vehicle). The vehicle 10 further includes a driving area 30 at the rear end 18 of the main frame 12 for allowing a driver to drive and operate the main frame 12.

As shown in FIGS. 1-5, the seat assembly 26 includes a seat body 32 in which the seats 28 (six seats 28 shown in FIGS. 1-5, where three seats 28 of the plurality of seats 28 are looking left and three seats 28 of the plurality of seats 28 are looking right) are embedded. Each one of the plurality of seats 28 includes a seat surface 34, a seat back wall 36 (aka, a backrest) and a seat side wall 38 (See FIG. 8). As shown on FIG. 8, the seat surface 34, the seat back wall 36 and the seat side wall 38 are integral to the seat body 32. It is however to be noted that the seats 28 may be provided with any configuration and shapes, such as to allow the plurality of individuals to be easily and safely transported within the vehicle 10 for pedestrian environments.

As shown in FIGS. 1-5, the main frame 12 includes a front wall 40 at or near the front end 20, a rear wall 42 at or near the rear end 18 and a floor member 44 which extends between the front wall 40 and the rear wall 42. The main frame 12 further includes anti-slip elements 46 on the floor member 44 that are aligned with each seat 28 of the seat assembly 26 such as to safely receive the individuals in the vehicle 10. As shown, the seat assembly 26 may further include one or more handle elements 48 (i.e., hand grips 48) (FIG. 2) extending from one or more seats 28 (and separating the different seat surfaces 34) for safety and convenience purposes for the individuals transported by the vehicle 10.

Figure 4:
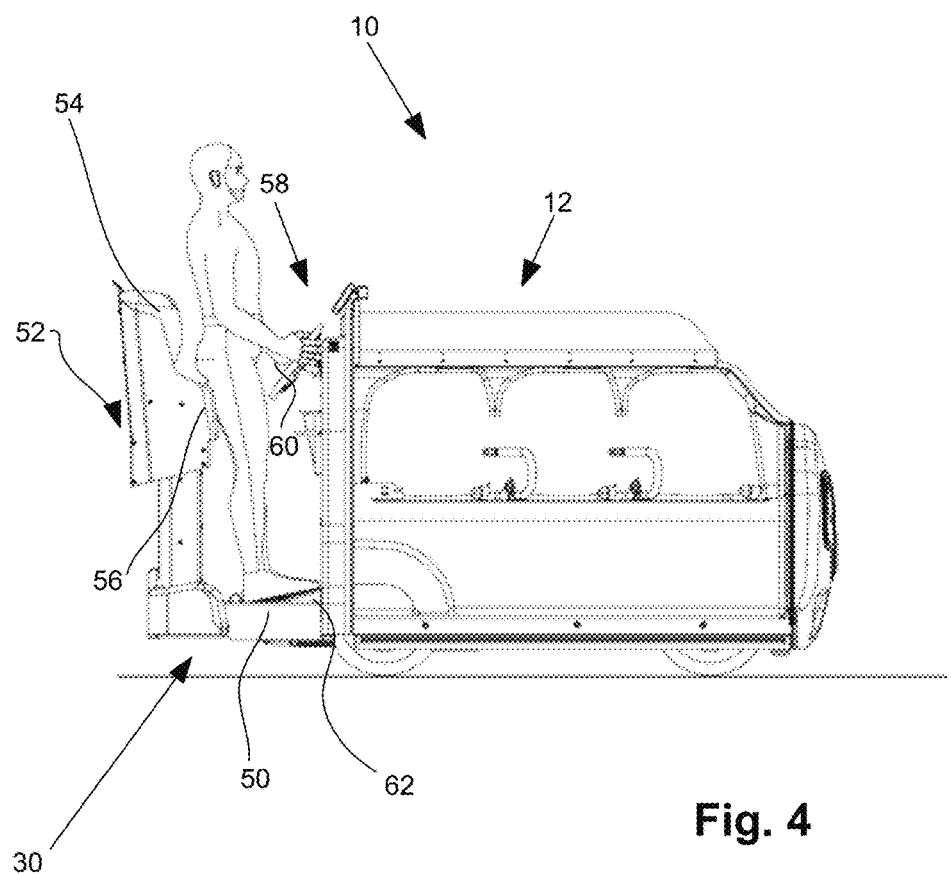
FIG. 4 is a side elevation view of the vehicle for a pedestrian environment of FIG. 1.
Figure 5:
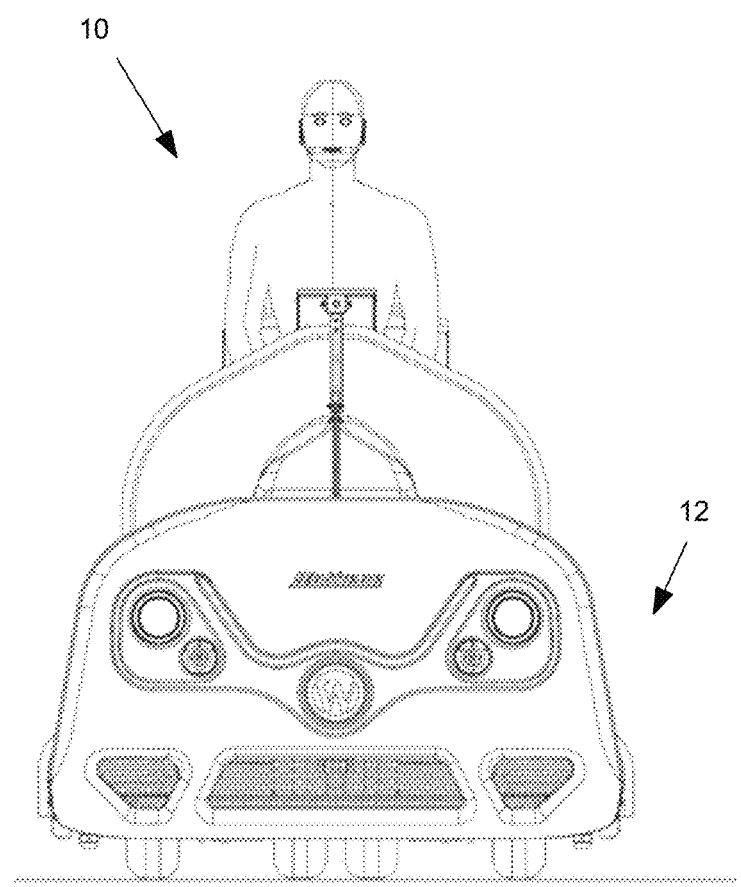
FIG. 5 is a front elevation view of the vehicle for a pedestrian environment of FIG. 1.
Figure 14:
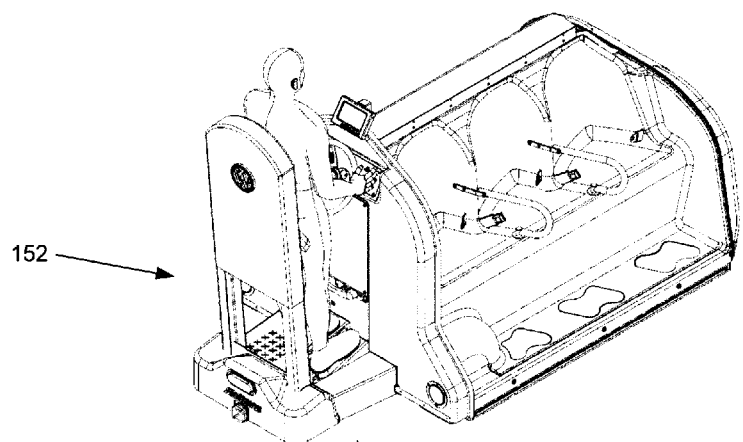
FIG. 14 is a rear perspective view of a vehicle for a pedestrian environment in accordance with another embodiment.
Figure 15:
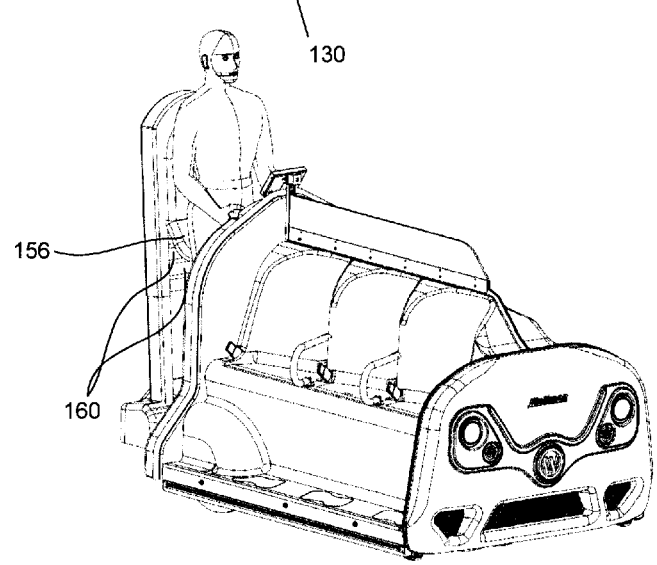
FIG. 15 is a front perspective view of the vehicle for a pedestrian environment of FIG. 14.
Figure 16:
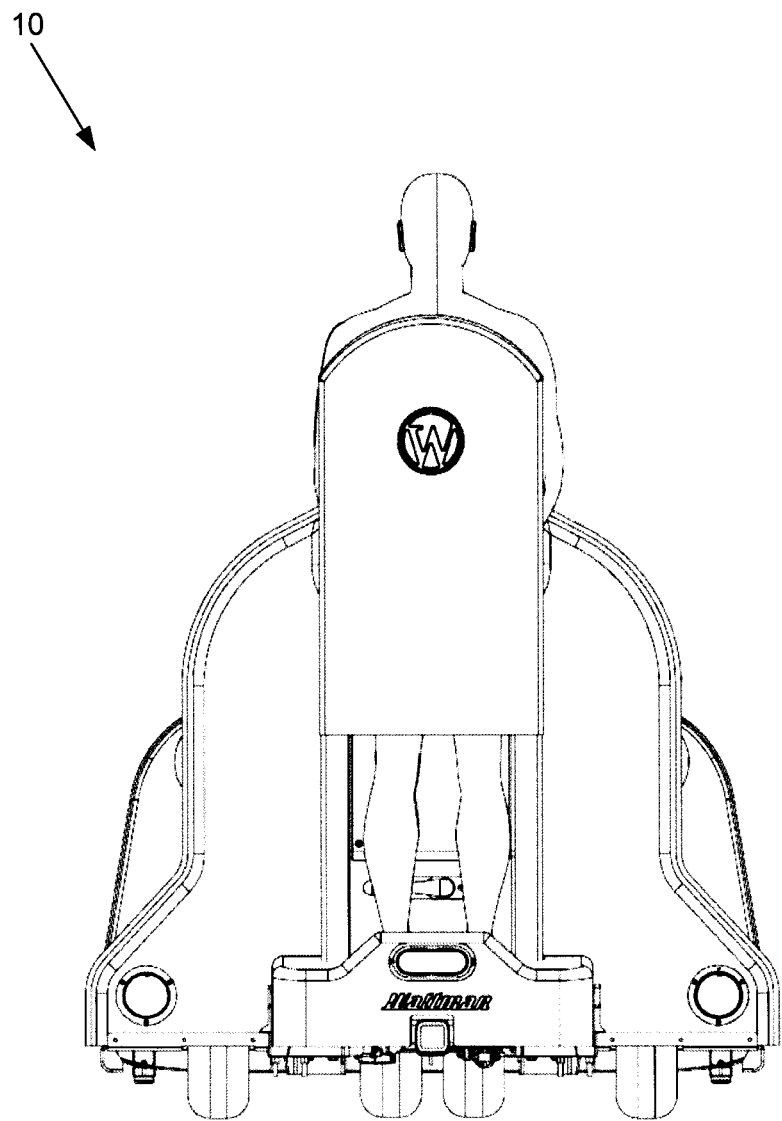
FIG. 16 is a rear elevation view of the vehicle for a pedestrian environment of FIG. 14.
Figure 17:
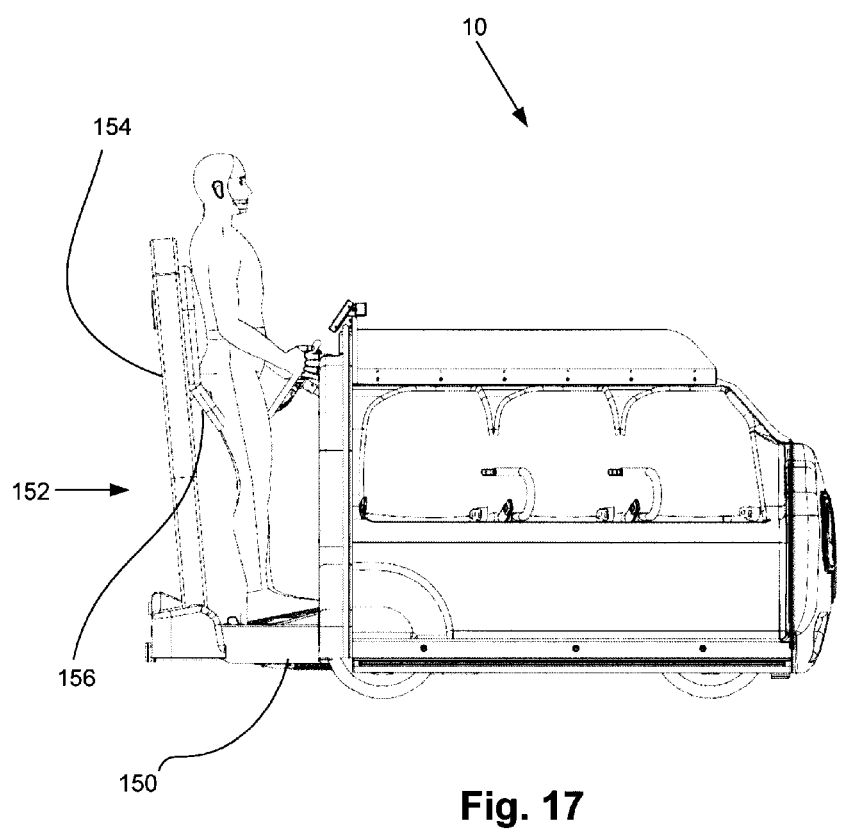
FIG. 17 is a side elevation view of the vehicle for a pedestrian environment of FIG. 14.
Figure 18:
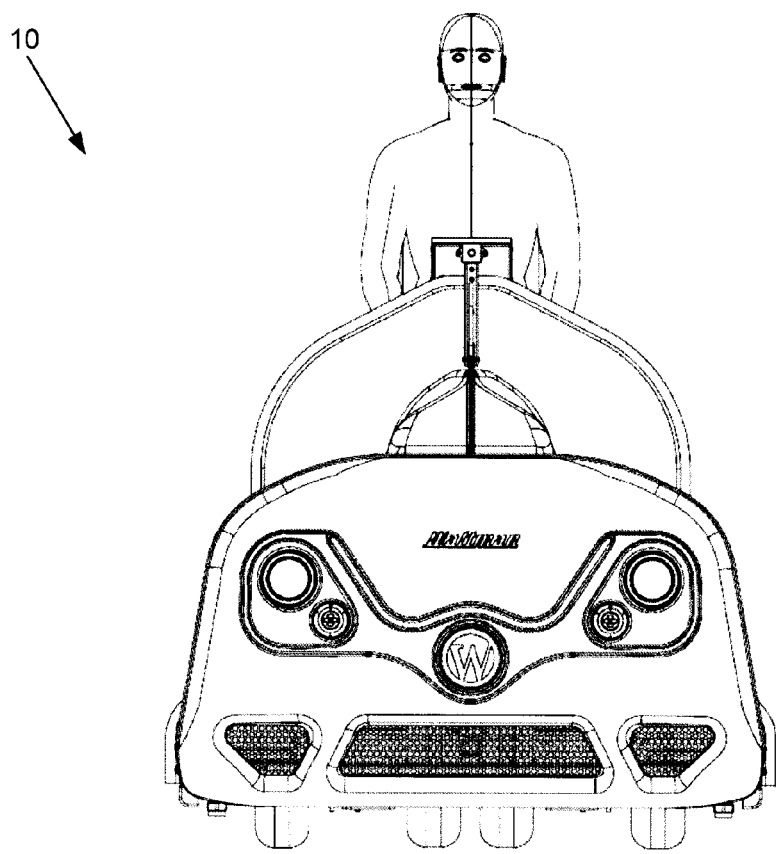
FIG. 18 is a front elevation view of the vehicle for a pedestrian environment of FIG. 14.
Figure 19:
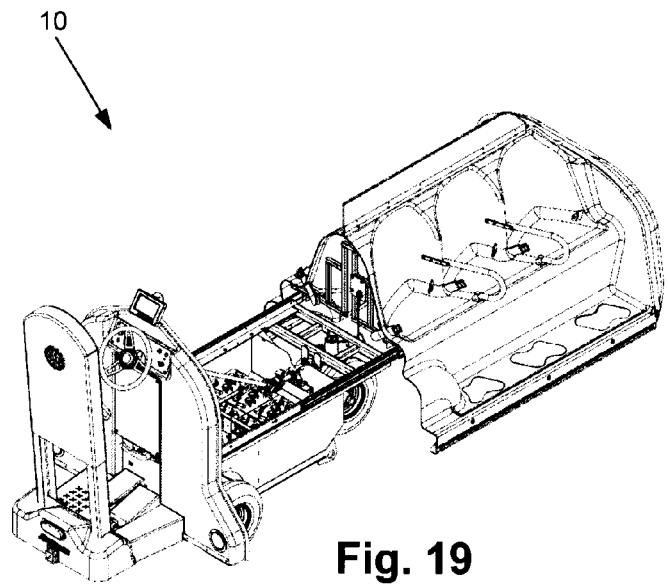
FIG. 19 is a rear perspective view of a vehicle for a pedestrian environment in accordance with another embodiment, showing a seat assembly in an opened position.
Figure 20:
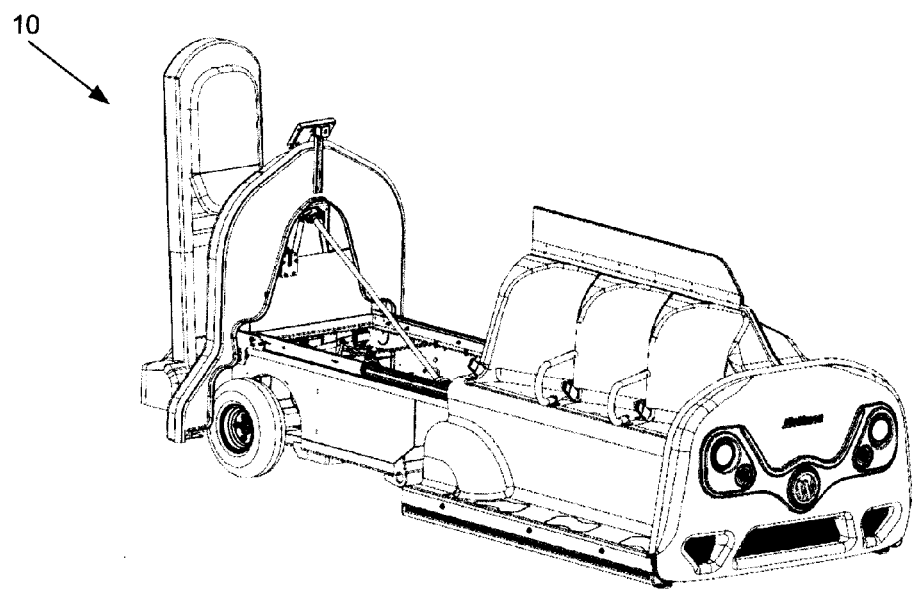
FIG. 20 is a front perspective view of the vehicle for a pedestrian environment of FIG. 19, showing the seat assembly in its opened position.

As better shown in FIG. 4, the driving area 30 includes a driving floor 50 and an adjustable driver seat 52 for allowing the driver to be in a selected one of a completely seated position, a semi-standing position (or perching position), or a standing position. The adjustable driver seat 52 includes a driver seat back wall 54 (aka, a driver backrest) and a driver seat portion 56. In FIG. 1, the driver is shown to be in a semi-standing position as a bottom portion of his back leans against the driver seat back wall 54 and a lower portion of his body leans against the driver seat portion 56. It is to be noted that the driver seat portion 56 may be provided with any suitable shape and/or configuration such as to allow the driver to adopt any one of the seated position, the semi-standing position, and the standing position. For example and as shown in FIGS. 14-20, the driving area 130 includes a driving floor 150 and an adjustable driver seat 152 for allowing the driver to be in a selected one of a completely seated position, a semi-standing position (or perching position), or a standing position. The adjustable driver seat 152 includes a driver seat back wall 154 which defines internal opposite longitudinal rails (not shown) and a driver seat portion 156. In FIG. 14, the driver is shown to be in a semi-standing position as his back leans against the driver seat back wall 154 and a lower portion of his body leans against the driver seat portion 156. As better shown in FIG. 15, the driver seat portion 156 may be adjustable between a plurality of seat positions depending on the height of the driver. The adjustable driver seat 152 further includes a plurality of rods 160 that are perpendicular to the internal opposite longitudinal rails of the driver seat back wall 154. Thus, the driver may decide to slide the driver seat portion 156 up or down along the internal opposite longitudinal rails and to lock it in a seat locked position with one of the plurality of rods 160.

The adjustable driver seat 52 may further includes a swivel assembly (not shown) for allowing the driver to easily pivot the driver seat back wall 54 and/or the driver seat portion 56 when going in or out the driving area 30 of the vehicle 10. This helps the driver to be comfortable during long day at work and to get in and out the vehicle 10 faster.

According to another embodiment, the driver seat back wall 54 and/or the driver seat portion 56 may be vertically and/or horizontally adjustable such as to provide the plurality of drivers (that may be driving the vehicle 10), of different shapes, weights and lengths, the capacity to adjust the adjustable driver seat 52 according to their requirements.

Still referring to FIG. 4, the driving area 30 further includes a steering assembly 58 operatively connected to the drive unit for driving and operating the vehicle 10. The steering assembly 58 may include a conventional steering wheel 60 to provide directional control to the vehicle 10. The driving area 30 further includes a driving pedal 62 for allowing the driver control the motor and hence the speed of the vehicle 10. The driving pedal 62 may be located on the driving floor 50 of the driving area 30 and configured such as to allow the right leg of the driver to be aligned with the driving pedal 62 (for safety and comfort purposes). The driving pedal 62 may be a conventional foot pedal for controlling speed and braking operations. It is to be mentioned that other means may replace the driving pedal 62 for allowing the driver to direct the vehicle 10. For example, the steering assembly 58 may alternatively further include buttons or a set of joysticks for allowing the driver to control the direction of the wheels 14 of the vehicle 10. The configuration of the adjustable driver seat 52 may give an all-round visibility to the driver and allow him to monitor the passengers transported by the vehicle 10, as well as to react to any unusual circumstances that may occur during operations.

Figure 21:
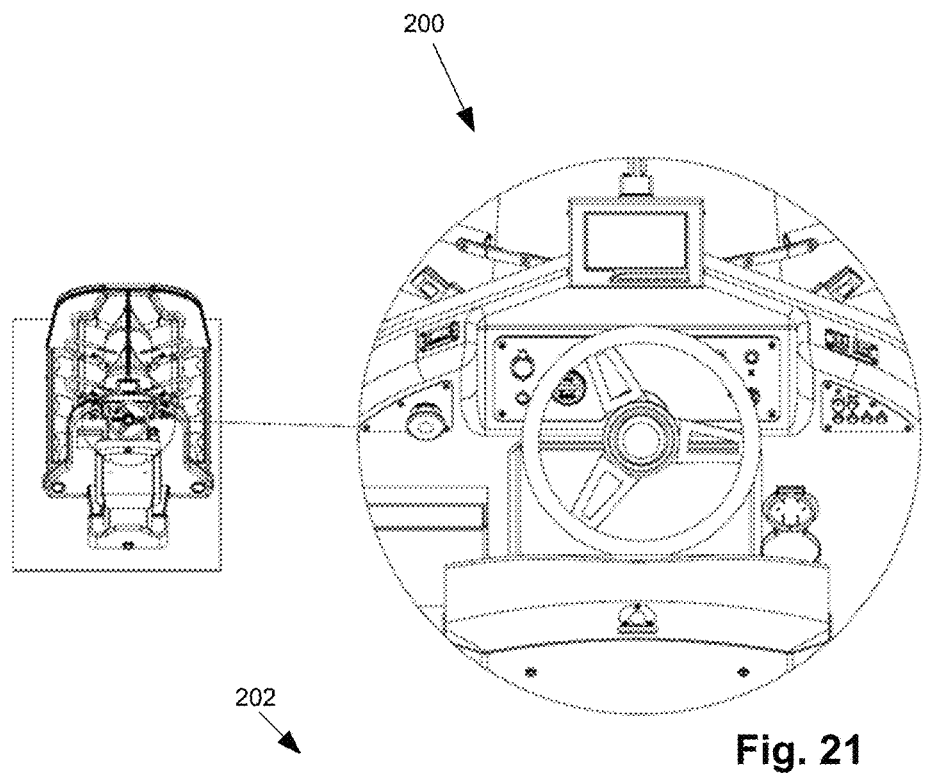
FIG. 21 is a close-up view of a driving panel of the vehicle for a pedestrian environment shown in FIGS. 1-7.
Figure 22:
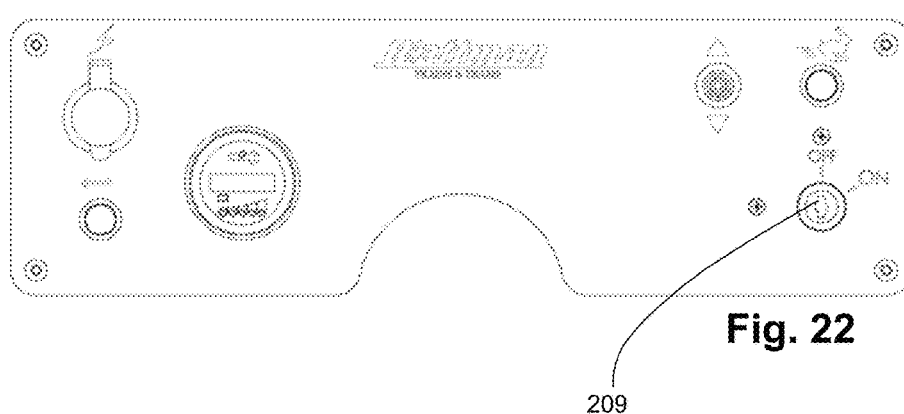
FIG. 22 is a close-up view of the control panel of the driving panel of FIG. 21.
Figure 23:
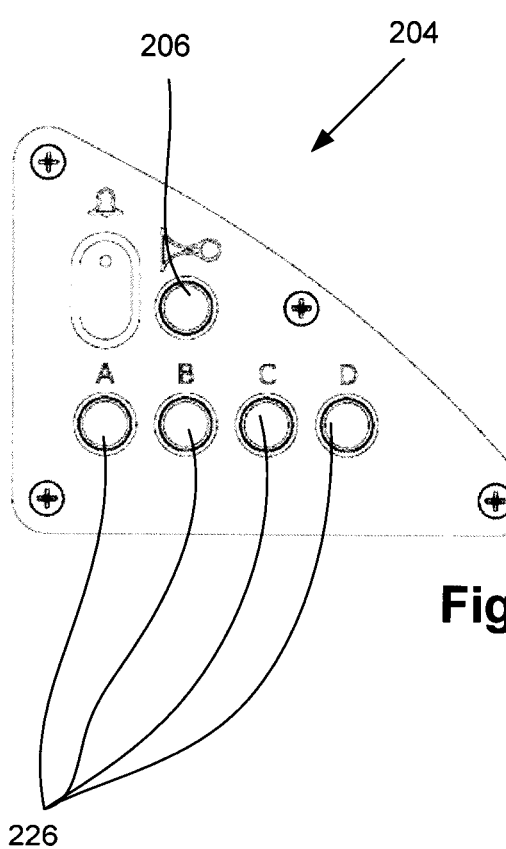
FIG. 23 is a close-up view of the sound panel of the driving panel of FIG. 21.
Figure 26:
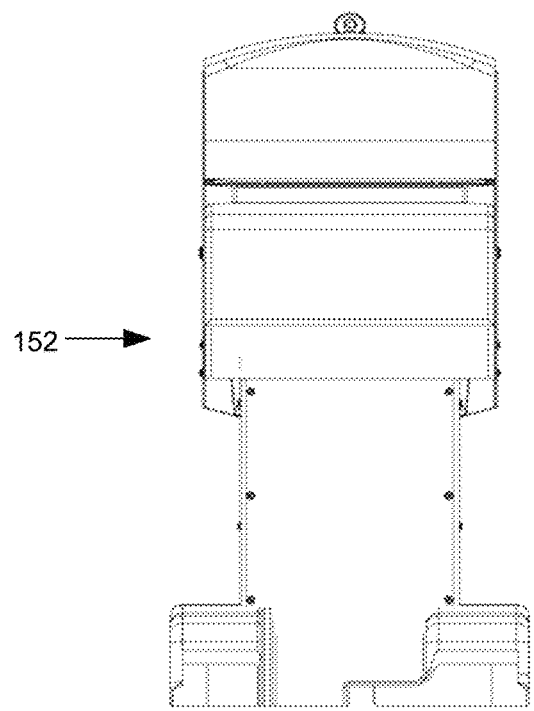
FIG. 26 is a front elevation view of the adjustable driver seat of the vehicle for a pedestrian environment shown in FIGS. 1-7
Figure 27:
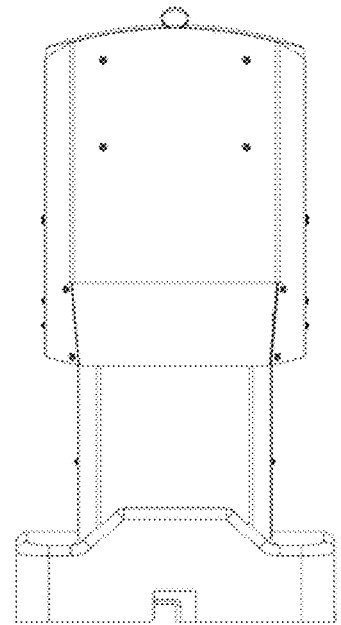
FIG. 27 is a rear elevation view of the adjustable driver seat of the vehicle for a pedestrian environment shown in FIGS. 1-7
Figure 28:
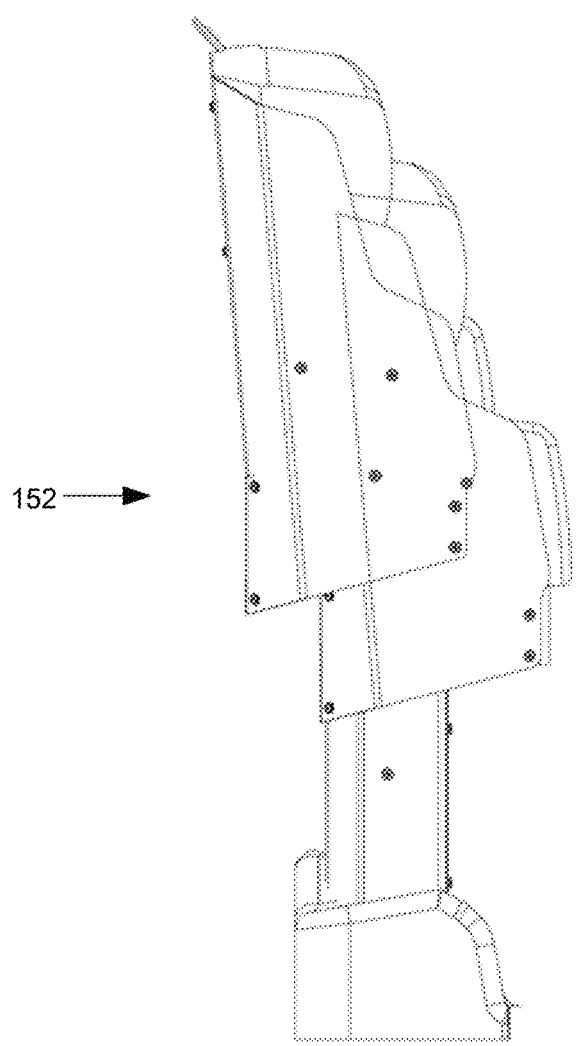
FIG. 28 is a side elevation view of the adjustable driver seat of the vehicle for a pedestrian environment shown in FIGS. 1-7, showing the adjustable driver seat in both its uppermost position and its lowermost position.

According to another embodiment, and referring now to FIGS. 21-23, there is shown that the driving area 30 may further include a driving panel 200 (FIG. 21), which includes a control panel 202 (FIG. 22) and a sound panel 204 (FIG. 23). The driving panel 200 may include control buttons for controlling the position of the adjustable driver seat 52, a horn control button 206 within the sound panel 204 (FIG. 23), and/or an on/off control device 209 (FIG. 22) within the control panel 202 for starting the engine.

According to another embodiment, speed of the vehicle 10 may be locked at maximum operating speed to better suit the operator's requirements.

According to another embodiment, the driving area 30 may further include a monitoring system (not shown) (i.e., a closed-circuit television monitor or CCTV monitor) for allowing the driver to view hazardous areas around the vehicle 10 to be aware of any objects, kids, luggage, and the like that may be in the hazardous areas around the vehicle 10 (i.e., in front of the vehicle 10, in the back of the vehicle, etc.). The monitoring system may also comprise a camera for filming the passengers of the vehicle 10 and record the same for administration purposes.

Figure 6:
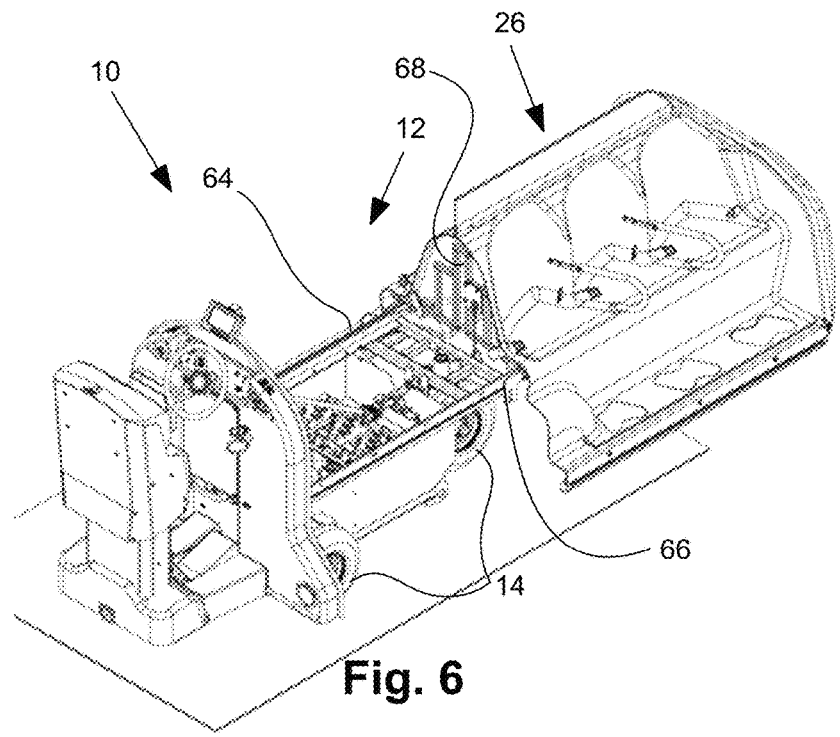
FIG. 6 is a rear perspective view of a vehicle for a pedestrian environment in accordance with another embodiment, showing a seat assembly in an opened position.
Figure 7:
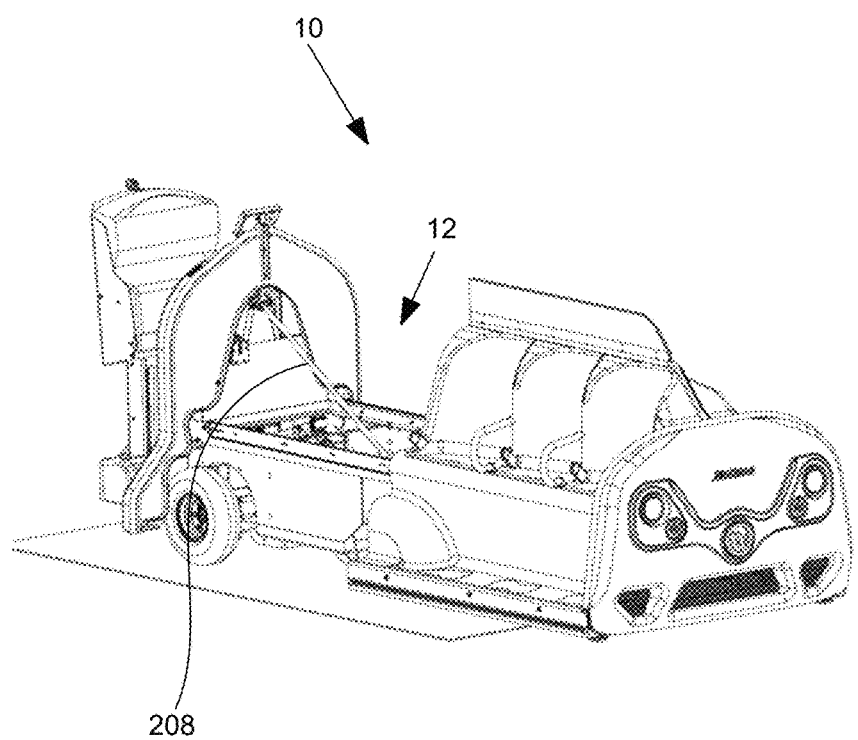
FIG. 7 is a front perspective view of the vehicle for a pedestrian environment of FIG. 6, showing the seat assembly in its opened position.
Figure 11:
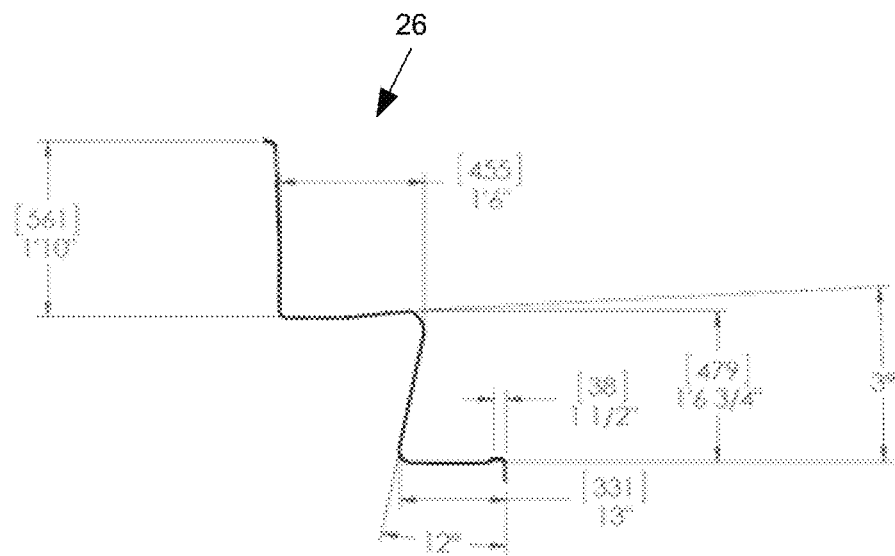
FIG. 11 is a cross-sectional view taken along line G-G of the seat assembly of FIG. 9.
Figure 12:
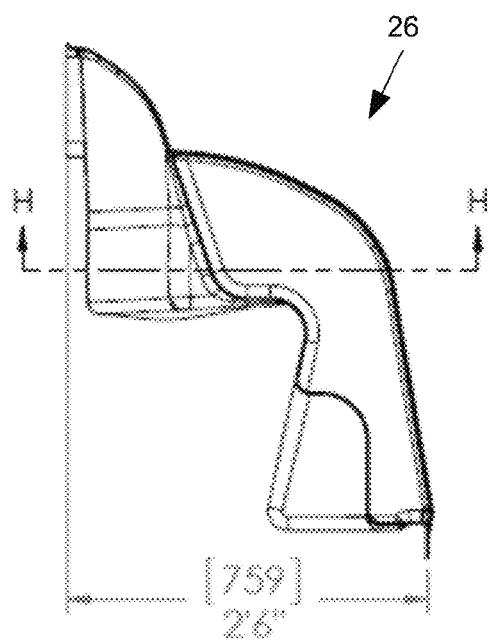
FIG. 12 is a end elevation view of the seat assembly of FIG. 8.
Figure 13:
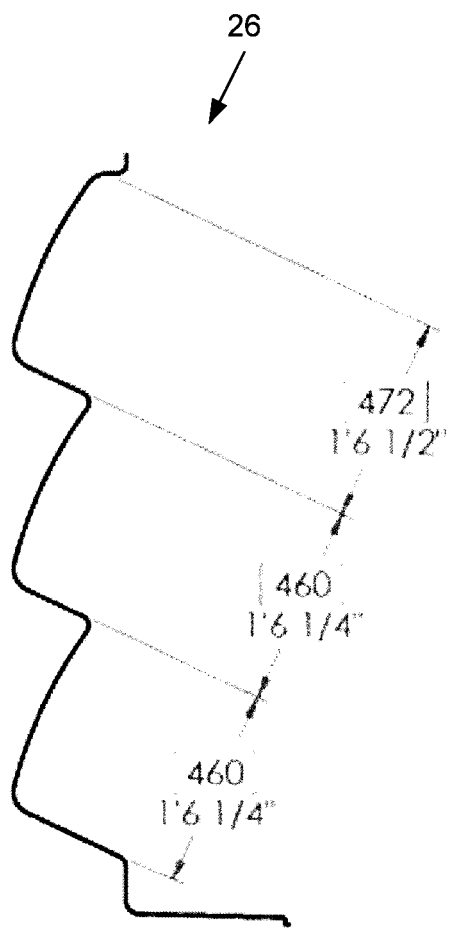
FIG. 13 is a cross-sectional view taken along line H-H of the seat assembly of FIG. 12.

According to another embodiment and referring now to FIGS. 6 and 7, there is shown that the main frame 12 of the vehicle 10 may further include a sliding rail assembly 64 for slidably receiving a corresponding sliding rail assembly 66 mounted on (or underneath) the seat body 32 of the seat assembly 26 for allowing an operator or maintenance personnel to have an access to the mechanics of the vehicle 10 (i.e., motor, driving unit, batteries and the like). Sliding rail assembly 64 and corresponding sliding rail assembly 66 further allow the operator to provide maintenance, reparation, and the like to the vehicle 10. Referring to FIG. 6, there is shown that the seat assembly 26 may further include a plurality of support members 68 for allowing its rigidity when receiving one or more individuals in the vehicle 10. The seat assembly 26 may be slidable according to the main frame 12 of the vehicle 10 between a closed and locked position (i.e., for passengers and driver security) (FIGS. 1-5) and an opened position (FIGS. 6 and 7) for maintenance of the vehicle 10. The vehicle 10 may further include an attachment member 208 (FIG. 7) extending between the main frame 12 and the seat assembly 26. Therefore, if the seat assembly 26 accidentally slides relative to the main frame 12 from its closed and locked position towards its opened position, then the attachment member will retain the seat assembly 26 to fully slide towards its fully opened position.

Figure 29:
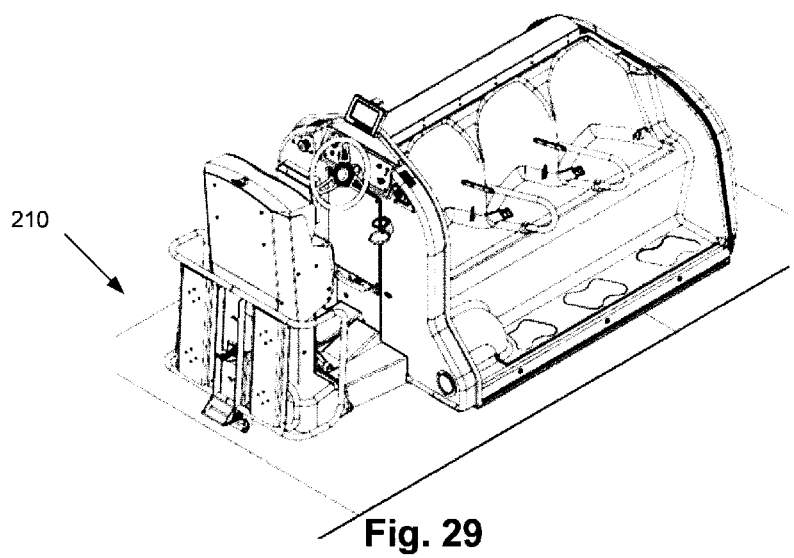
FIG. 29 is a rear perspective view of a vehicle for a pedestrian environment in accordance with another embodiment, showing a luggage carrier in its retracted position and releasably attached to the vehicle.
Figure 30:
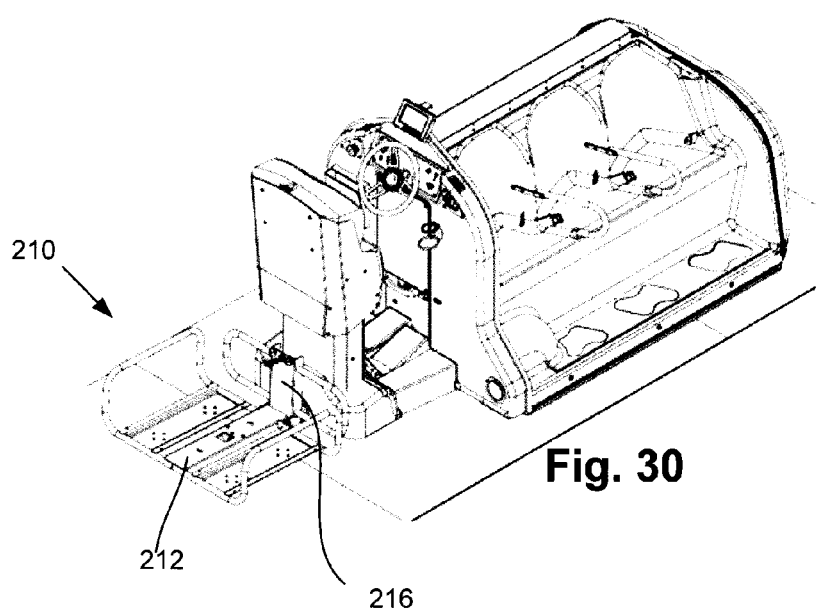
FIG. 30 is a rear perspective view of a vehicle for a pedestrian environment in accordance with another embodiment, showing a luggage carrier in its luggage receiving position and releasably attached to the vehicle.
Figure 31:
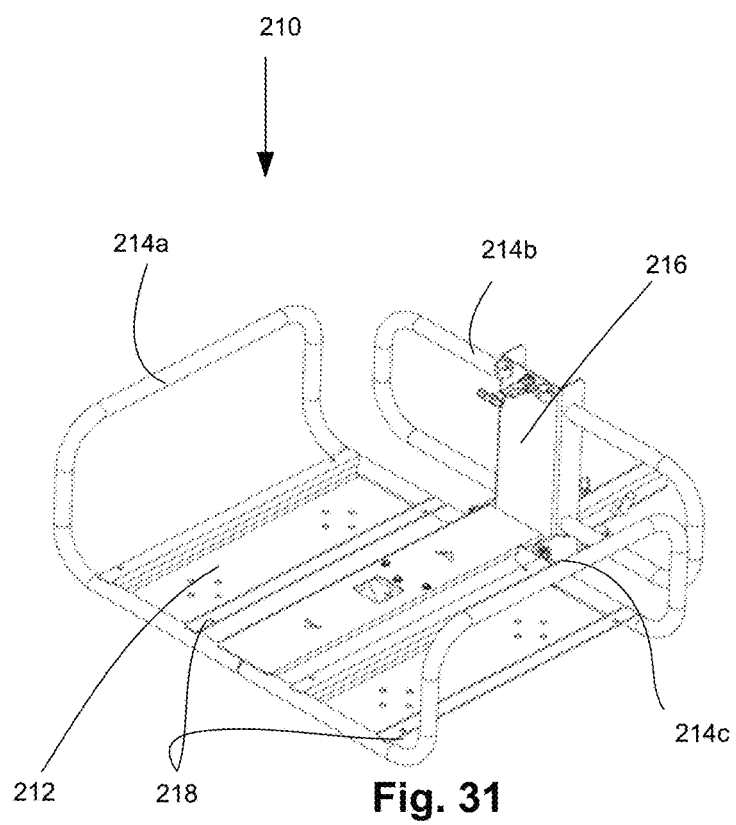
FIG. 31 is a close-up view of the luggage carrier shown in FIGS. 29 and 30.
Figure 32:
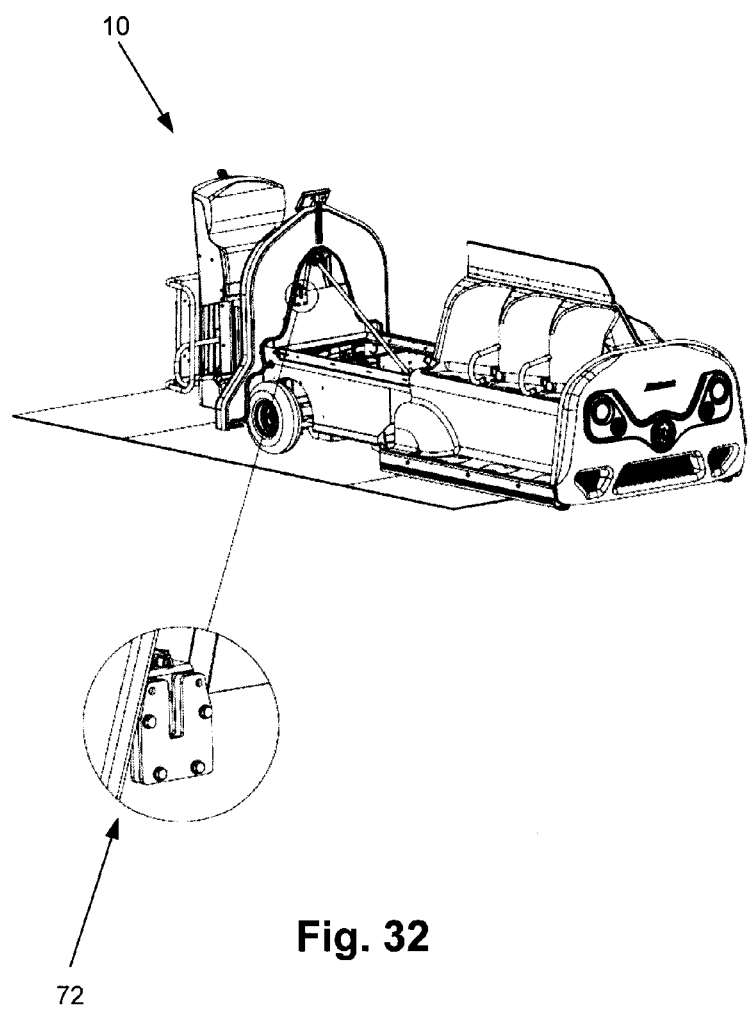
FIG. 32 is front perspective view of a vehicle for a pedestrian environment in a opened position (unlocked) and comprising a releasable safety attachment between the rear wall and the seat assembly according to an embodiment with a close-up perspective view a portion of the releasable safety attachment.
Figure 33:
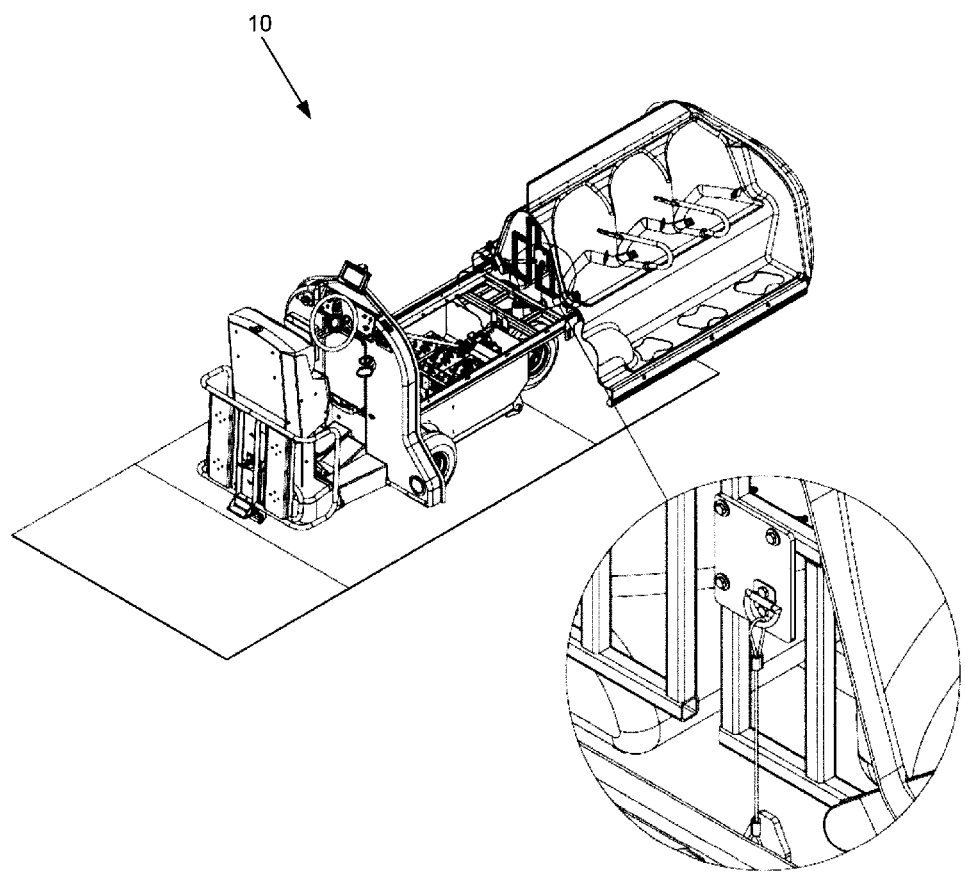
FIG. 33 is rear perspective view of the vehicle for a pedestrian environment of FIG. 32 in opened position and comprising a releasable safety attachment between the rear wall and the seat assembly with a close-up perspective view of a portion of the releasable safety attachment.

According to another embodiment and referring now to FIGS. 29-31, there is shown a luggage carrier 210 to be releasably attached to the attachment member 70 (FIG. 3) of the vehicle 10. The luggage carrier 210 may extend between its luggage receiving position (FIG. 30) and its retracted position (FIG. 29). As best shown in FIG. 31, the luggage carrier 210 includes a substantially flat member 212 for receiving the luggage, extending members 214a, 214b, 214c upwardly extending from the substantially flat member 212 for retaining the luggage on the substantially flat member 212 and a connection member 216 connecting the substantially flat member 212 to the attachment member 70 (FIG. 3) for allowing the luggage carrier 210 to extend between its luggage receiving position (FIG. 30) and its retracted position (FIG. 29). It is to be noted that the substantially flat member 212 defines openings 218 so that if a wheelchair is supported by the substantially flat member 212 of the luggage carrier 210, the wheels of the wheelchair (not shown) will correspond with the openings 218 defined within the substantially flat member 212. It is also to be noted that the substantially flat member 212 is retained in its retracted position using a magnet arrangement according to an embodiment. According to another embodiment, the substantially flat member 212 is retained in its retracted position using a rubber attachment member.

Figure 3:
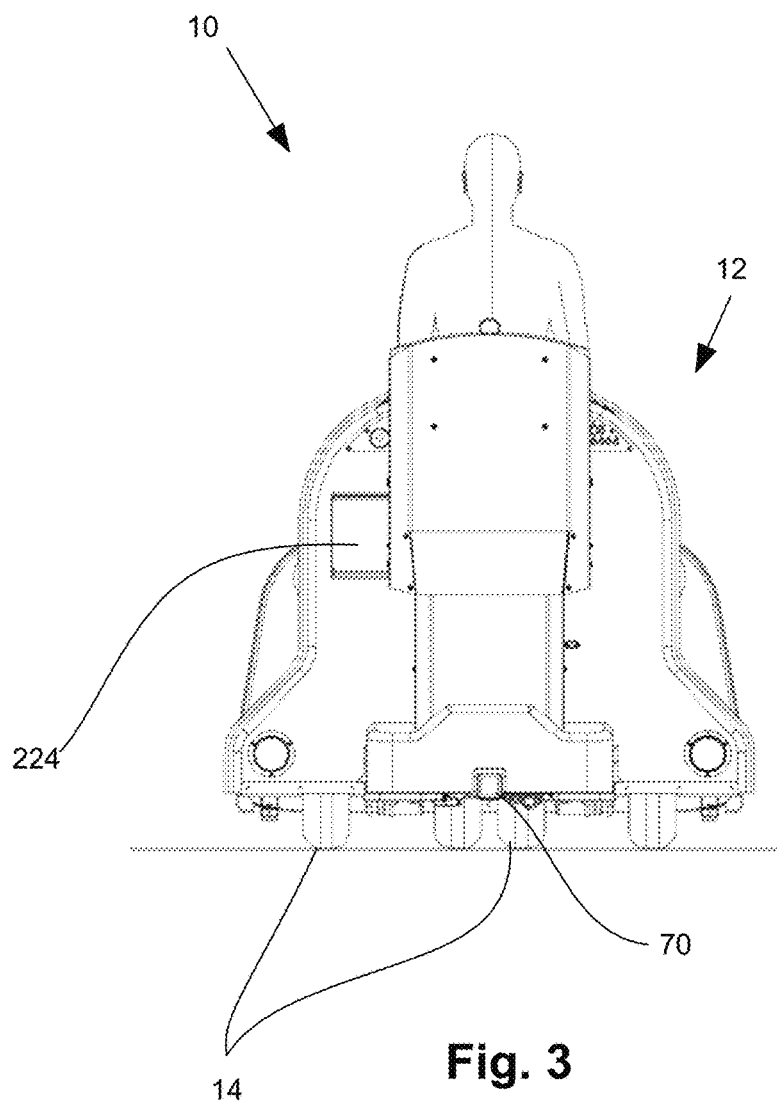
FIG. 3 is a rear elevation view of the vehicle for a pedestrian environment of FIG. 1.

According to another embodiment and as better shown in FIG. 3, the main frame 12 of the vehicle 10 may further include an attachment member 70 at the rear end 18 of the main frame 12 for releasably connecting the additional luggage carrier 210 shown in FIGS. 29-31 to transport additional objects, luggage, and the like. The attachment member 70 may further be used to attach releasably conventional objects such as, without limitation, a wheel chair, a dog cage supported by wheels, a two-wheel trailer for transporting equipment and/or sport garments and the like.

According to another embodiment and referring now to FIGS. 8-13, and more particularly to FIG. 9, there is shown that each seat 28 of the seat assembly 26 may be configured such as to have an angle according to the longitudinal axis 16 defined by the main frame 12. As shown in FIG. 9, the angle θ between the longitudinal axis 16 and the alignment of the seat 28 (i.e., the alignment direction) is 65° (or 25° between a perpendicular axis defined by the main frame 12 and the alignment of the seat 28). This alignment of the seat 28 (θ=65°) allows the individuals that are installed in the seat assembly 26 of the vehicle 10 to look both in front of the vehicle 10 and to the side of the vehicle 10 (i.e., it allows a good visibility to the individuals, independently of their positions in the vehicle 10). Additionally, this configuration of the seats 28 allows the individual to easily, quickly and safely get in and out of the vehicle 10. This is important in pedestrian environments such as airports when people are often running out of time to get to their flights. According to an embodiment, the angle θ between the longitudinal axis 16 and the alignment of the seat 28 is between 45 degrees and 90 degrees.

According to the configuration of the seats 28, the three seats 28 shown to be on one side of the seat assembly 26 will have a slightly different seat surface 34. Therefore, a person that needs more space would be able to sit near the driving area 30, while a person that requires less space would have no problem to sit near the front wall 40 of the vehicle 10.

According to an embodiment, the set of wheels 14 supporting the main frame 12 of the vehicle 10 may be configured such as to allow the vehicle 10 to turn 360° in almost the own length of the vehicle 10. As better shown in FIGS. 3 and 6, two wheels 14 are located in front of the vehicle 10 and the distance between these wheels is relatively small. At the other end, two wheels 14 are located in the back of the vehicle 10 and the distance between these wheels is relatively larger. Normally the front wheels 14 may rotate 360° on the same axis thereby allowing rotation of the vehicle 10. Alternatively, each one of the wheels 14 may rotate 140° for allowing rotation of the vehicle 10.

According to another embodiment, the vehicle 10 may further include a lighting system (not shown). The lighting system may further include front and rear lights (i.e., dot style front and rear lights) and brake and turn light indicators according to standard color scheme. The lighting system may further include a light pole (not shown) that can be releasably mounted on the main frame 12 and/or on the seat assembly 26.

According to another embodiment, the vehicle 10 may further include a safe and audible reverse motion alarm as well as a warning horn. A flashing high level warning light may also be provided on the vehicle 10 for informing other individual walking in the pedestrian environment of potential hazards.

According to another embodiment, each seat 28 of the seat assembly 26 may further include seat belts 220 (FIG. 2) (i.e., such as full lap style seat belts) for allowing the individuals to be safely attached in the vehicle 10.

According to another embodiment, the main frame 12 may include a metal composition, such as steel, or any other composition such as, without limitation, a polymeric composition, a composite material composition, and the like. The main frame 12 may be made of a material that is sufficiently strength and resistant such as to carry the weight of the seat assembly 26 and the weight of the individuals transported by the vehicle 10.

According to another embodiment, the seat assembly 26 may be made of a fiberglass composition, of an UV resistant composition, or of any suitable composition that is resistant, easy to wash and the like.

According to another embodiment, the fiberglass composition may further include an anti-microbial composition for allowing a simple and quick cleaning maintenance.

According to another embodiment, the vehicle 10 may be an electric vehicle (green, quiet, and safe) and may include one or more power supply batteries. Propulsion of the main frame 12 may be provided by a 48 volts rechargeable battery pack. The 48 volts rechargeable battery pack may be provided with a standalone battery charger.

According to another embodiment, the motor may be an AC induction motor that is efficient and that lasts a long time.

According to another embodiment, the main frame 12 and/or the driving area 30 may further include a holder 222 for receiving a beverage can, such as a coffee holder or the like, and/or a receiving member 224 (FIG. 3), such as a basket or any other suitable means, for receiving the driver's accessories (i.e., papers, schedules, sun glasses, hat, gloves, and the like). For instance, the holder 222 and/or the receiving member 224 may be mounted on the rear wall 42 of the main frame 12.

According to another embodiment, the vehicle 10 may further include one or more speaker(s) so that the driver may directly communicate with the passengers of the vehicle 10 or with pedestrians around the vehicle 10 or communicate with the passengers of the vehicle 10 or with pedestrians around the vehicle 10 using pre-recorded safety messages (i.e., using audio buttons 226 (FIG. 23) on the sound panel 204 within the driving area 30).

The vehicle 10 described above allows safe and easy transportation of individuals in pedestrian environments such as, airports, shopping centers, amusement parks, hotels, tourist areas, hospitals, and the like.

The vehicle 10 as described above is configured to provide a rear operational driver position.

The vehicle 10 as described above may have a six to one passenger/driver ratio for optimized operating costs.

Now referring to FIGS. 32-35, there is shown an embodiment of a releasable safety attachment 72 between the rear wall and the seat assembly of the vehicle 10. The releasable safety attachment 72 comprises a locking plate 76 attached to a safety line 78 which in turn is attached to a mounting plate 80. The releasable safety attachment 72 further comprises a locking plate receiving member 74. The locking plate receiving member 74 is mounted to the rear wall while the mounting plate 80 is mounted to the seat assembly.

Figure 34:
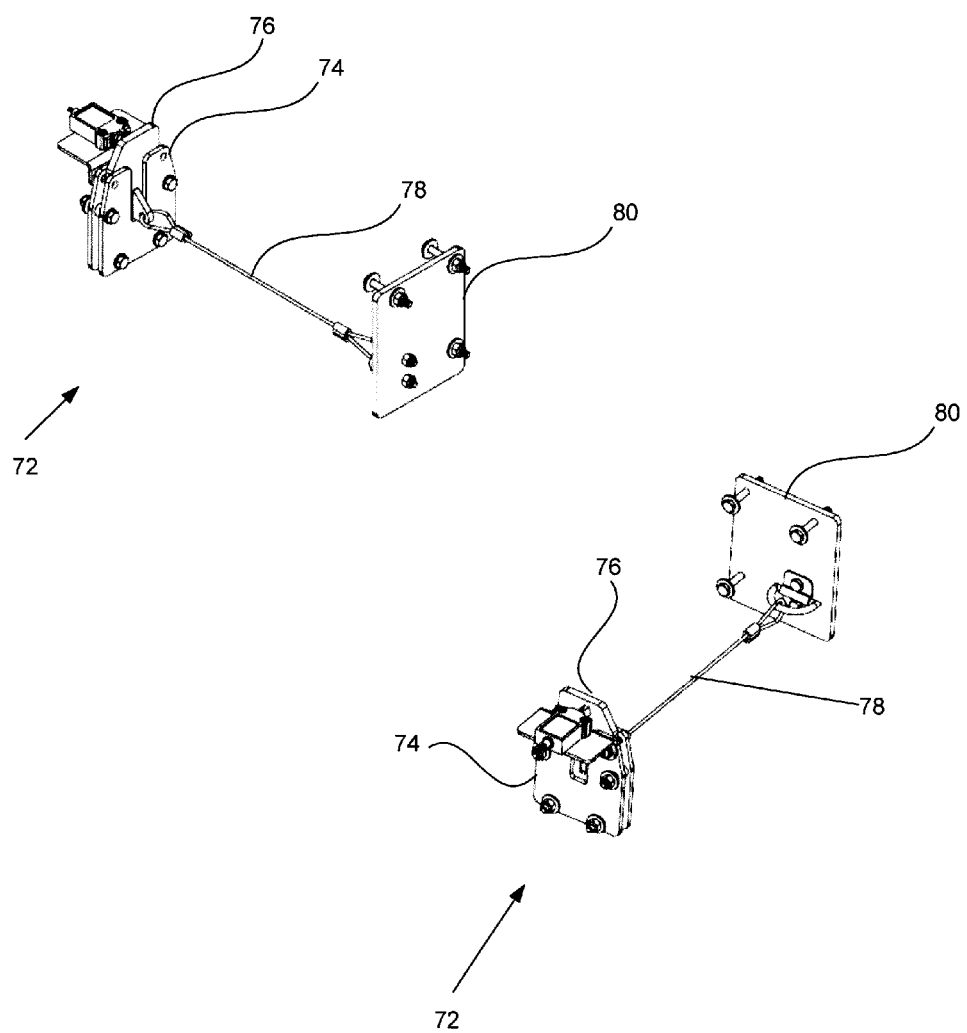
FIG. 34 comprises two perspective views of the releasable safety attachment of FIG. 32 in an attached position.
Figure 35:
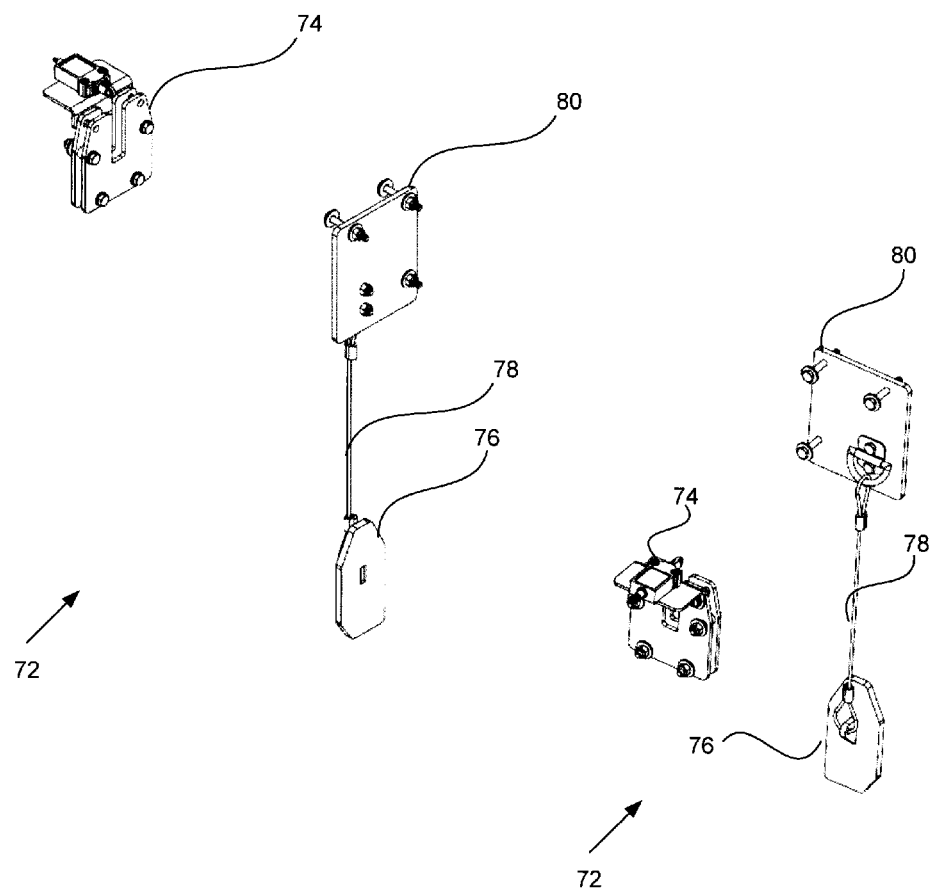
FIG. 35 comprises two perspective views of the releasable safety attachment of FIG. 32 in a detached position.

FIG. 34 shows the releasable safety attachment 72 in an attached position in which the locking plate 76 is inserted in the locking plate receiving member 74. FIG. 35 shows the releasable safety attachment 72 in which the locking plate 76 is detached from the locking plate receiving member 74.

In operation, once the seat assembly is disconnected from the rear wall, the releasable safety attachment 72 prevents the seat assembly from sliding past an intermediate position near the closed and locked position.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A vehicle for transporting an individual, the vehicle comprising:
   a main frame having a substantially longitudinal shape and comprising a rear end and a front end opposite the rear end, the main frame defining a longitudinal axis;
   a seat assembly mounted on the main frame, the seat assembly comprising at least two seats each adapted for seating the individual and each comprising a backrest defining an alignment direction corresponding to a direction substantially perpendicular to a middle of the backrest, the alignment direction making an angle between 45 degrees and 90 degrees relative to the longitudinal axis defined by the main frame; and
   a driving area at the rear end of the main frame for driving and operating the main frame, wherein the driving area defines a driving position facing the front end of the vehicle.

2. The vehicle of claim 1, wherein the seat assembly comprises a seat body in which the at least two seats are embedded, wherein each one of the at least two seats are adapted for seating a single individual.

3. The vehicle of claim 2, wherein each one of the at least two seats further comprises a seat surface, from which extends the backrest, and a seat side wall extending from both the seat surface and the backrest.

4. The vehicle of claim 3, wherein the seat surface, the backrest and the seat side wall are integral to the seat body.

5. The vehicle of claim 4, wherein the seat assembly further comprises a plurality of handle elements, each one of the plurality of handle elements separating two adjacent seats of the at least two seats.

6. The vehicle of claim 5, wherein a right side and a left side of the vehicle are defined respectively as a side to the right and to the left of the vehicle looking toward the front end of the main frame from the rear end of the main frame, further wherein the at least two seats comprise at least two seats on the right side and at least two seats on the left side.

7. The vehicle of claim 1, wherein the vehicle comprises a front wall in the vicinity of the front end of the main frame, a rear wall in the vicinity of the rear end of the main frame and a floor member extending continuously between the front wall and the rear wall.

8. The vehicle of claim 1, further comprising a motor mounted on the main frame and a drive unit operatively connected to the motor for propelling the main frame, wherein the motor and the drive unit are located under the seat assembly.

9. The vehicle of claim 8, wherein the main frame further comprises a sliding rail assembly and wherein the seat assembly comprises a corresponding sliding rail assembly, the sliding rail assembly for slidably receiving the corresponding sliding rail assembly, thereby allowing the seat assembly to be slidable relative to the main frame between a closed and locked position and an opened position, wherein the opened position provides an access to the motor and drive unit.

10. The vehicle of claim 9, wherein the closed and locked position of the seat assembly corresponds to the seat assembly being connected to the rear wall, the vehicle further comprising a releasable safety attachment between the rear wall and the seat assembly, wherein once disconnected the seat assembly is disconnected from the rear wall, the releasable safety attachment prevents the seat assembly from sliding past an intermediate position near the closed and locked position.

11. The vehicle of claim 8, wherein the driving area further comprises a monitoring system operatively connected with the drive unit for allowing a driver to view around the main frame, the monitoring system comprising a closed-circuit television monitor in the driving area and a camera mounted on the main frame.

12. The vehicle of claim 1, wherein the driving area further comprises an adjustable driver seat for allowing a driver to be in a selected one of: a completely seated position, a semi-seated position and a standing position.

13. The vehicle of claim 12, wherein the adjustable driver seat comprises a driver seat portion and a driver backrest upwardly extending from the driver seat portion.

14. The vehicle of claim 13, wherein at least one of: the driver seat portion and the driver backrest is at least one of: vertically and horizontally adjustable.

15. The vehicle of claim 1, further comprising an attachment member behind the driving area for releasably receiving a luggage carrier to transport additional objects.

16. The vehicle of claim 15, further comprising the luggage carrier releasably attached to the attachment member to transport the additional objects.

17. The vehicle of claim 1, wherein the alignment direction makes an angle of 65 degrees relative to the longitudinal axis defined by the main frame.

18. The vehicle of claim 1, further comprising a set of wheels for supporting the main frame, wherein at least one wheel from the set of wheels is rotatable 140 degrees for allowing rotation of the vehicle.

* * * * *